Figure 7:
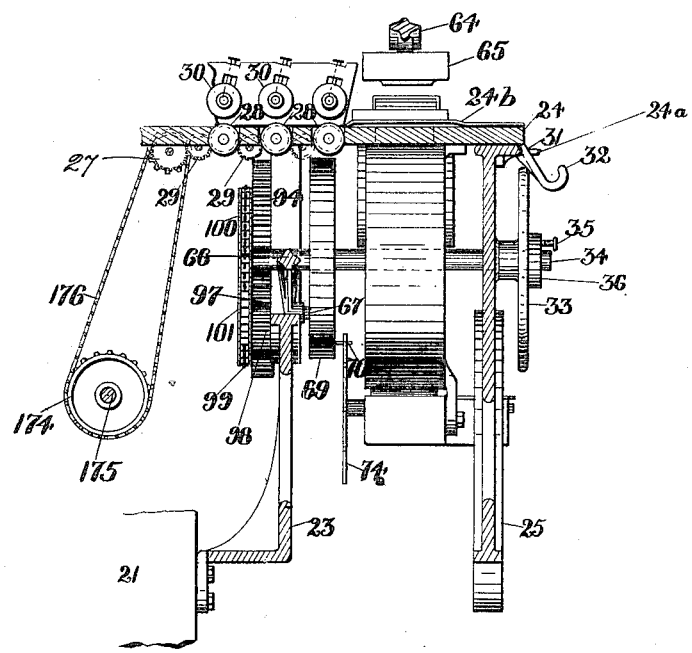

L. M. NIELSEN.
MACHINE FOR ADDRESSING AND ASSORTING NEWSPAPERS, &c.
APPLICATION FILED MAY 24, 1905.
964,449.
Patented July 12, 1910.
8 SHEETS—SHEET 1.
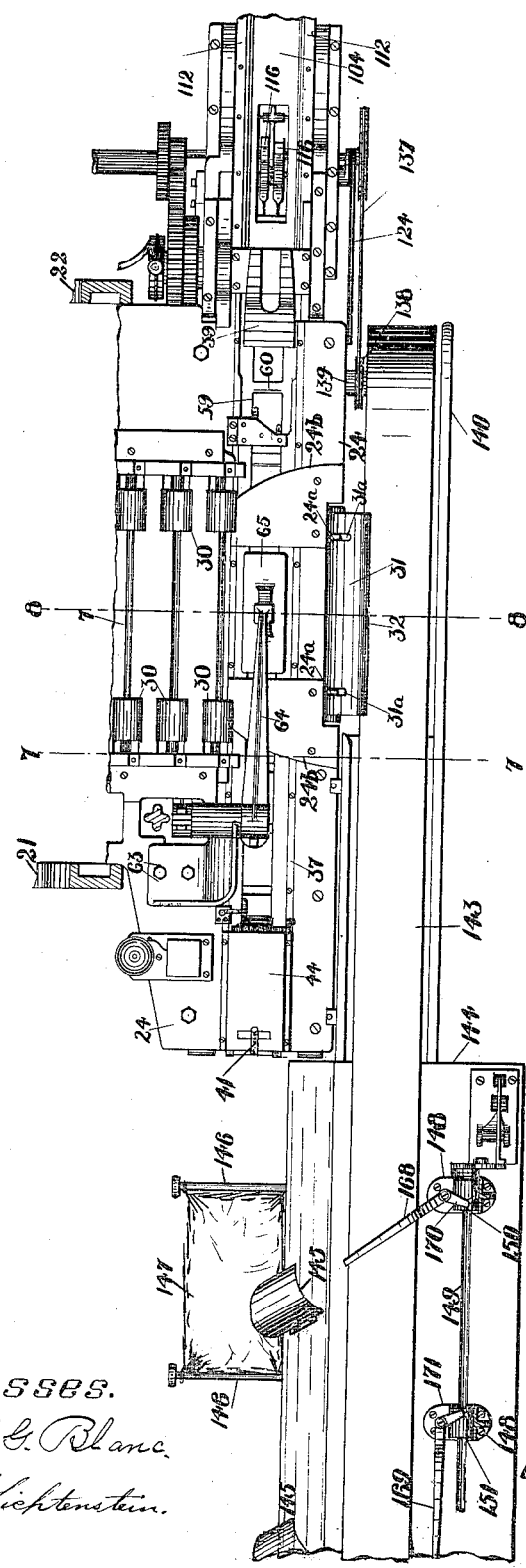
Witnesses.
Raphael G. Blanc.
David Lichtenstein.
Inventor:
Laurits M. Nielsen
by Henry J. Miller
Attorney.

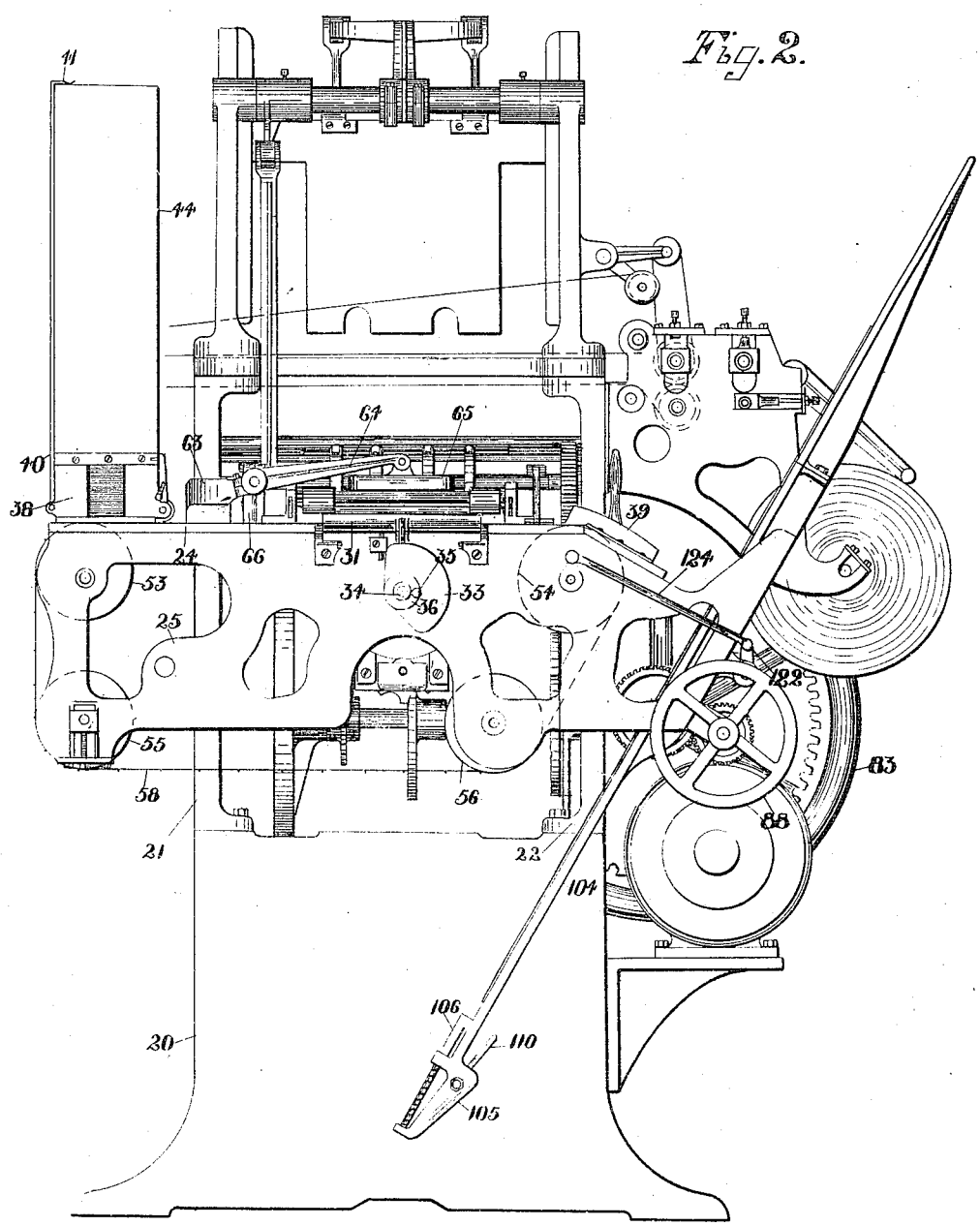

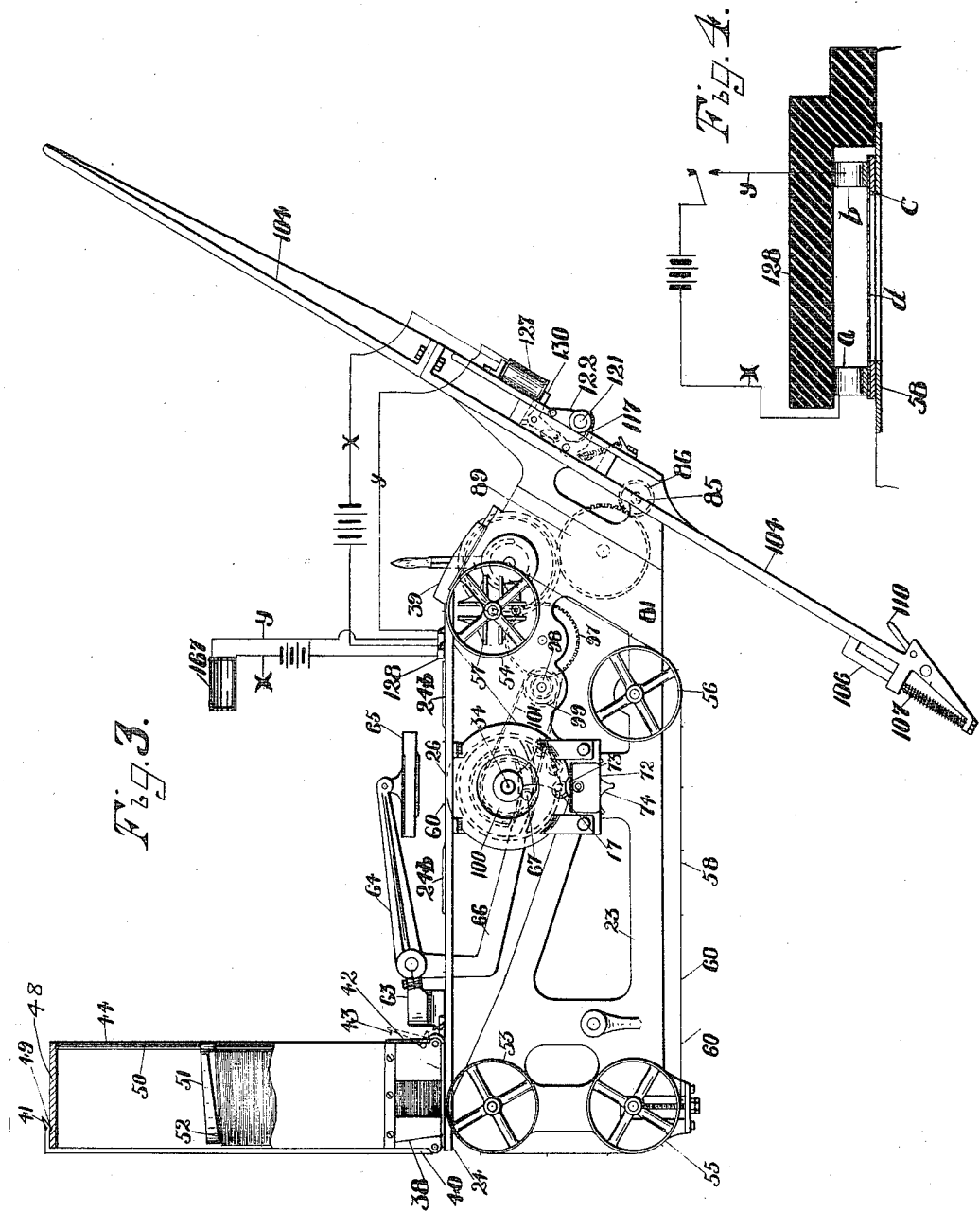

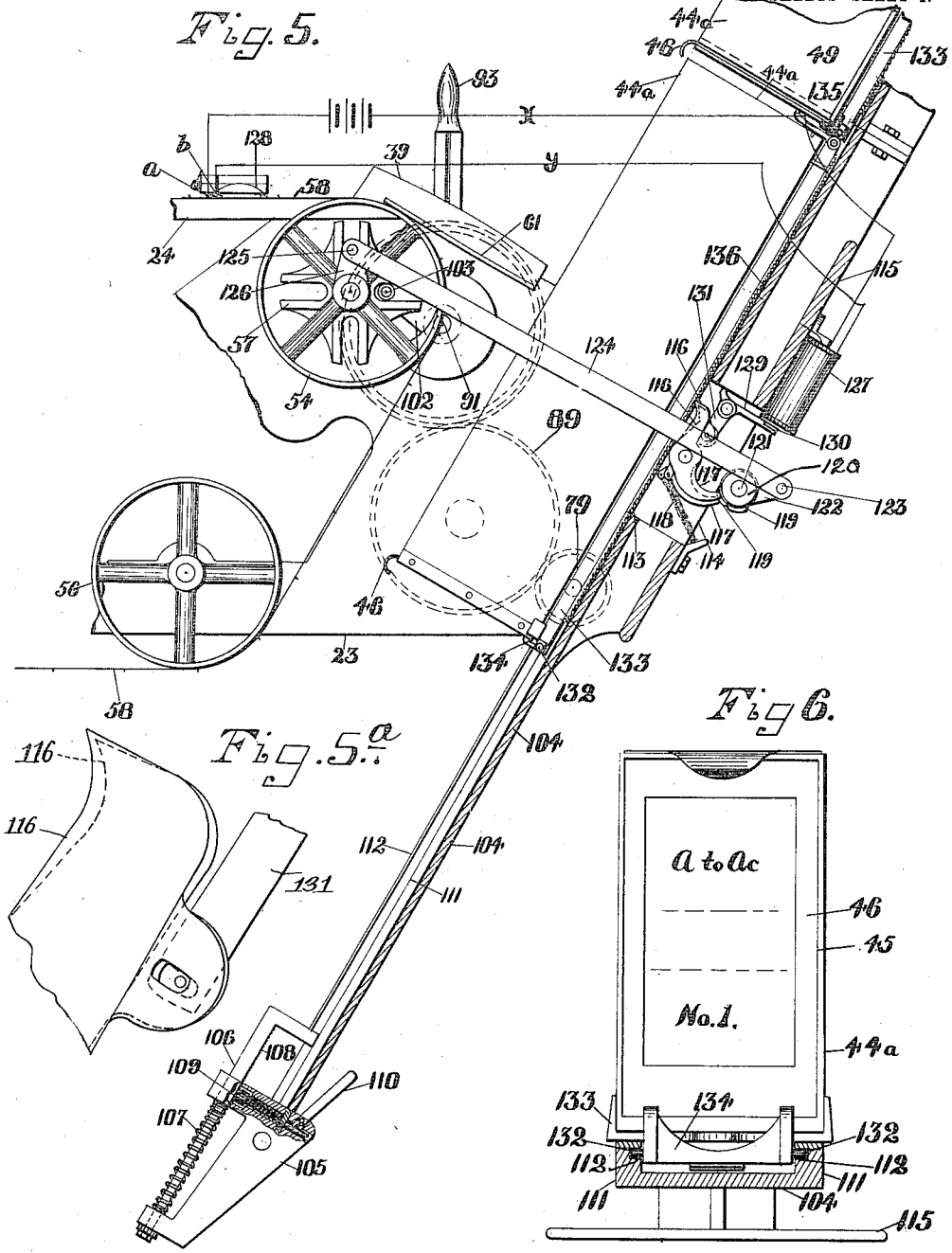

L. M. NIELSEN.
MACHINE FOR ADDRESSING AND ASSORTING NEWSPAPERS, &c.
APPLICATION FILED MAY 24, 1905.

964,449.

Patented July 12, 1910.

8 SHEETS—SHEET 5.

Witnesses.
Raphael G. Blanc.
David Lichtenstein.

Inventor
Laurits M. Nielsen
by Henry J. Miller
Attorney.

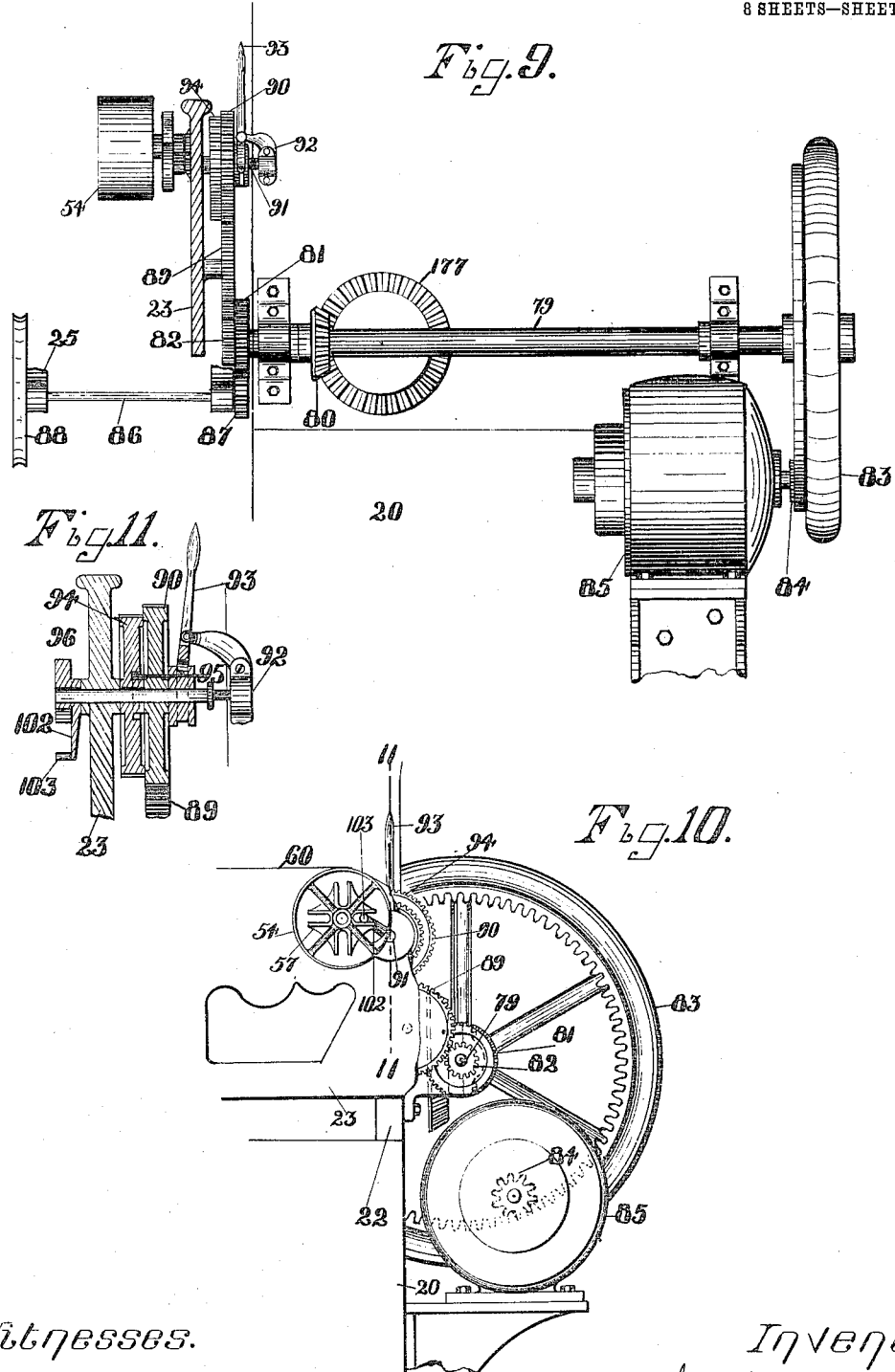

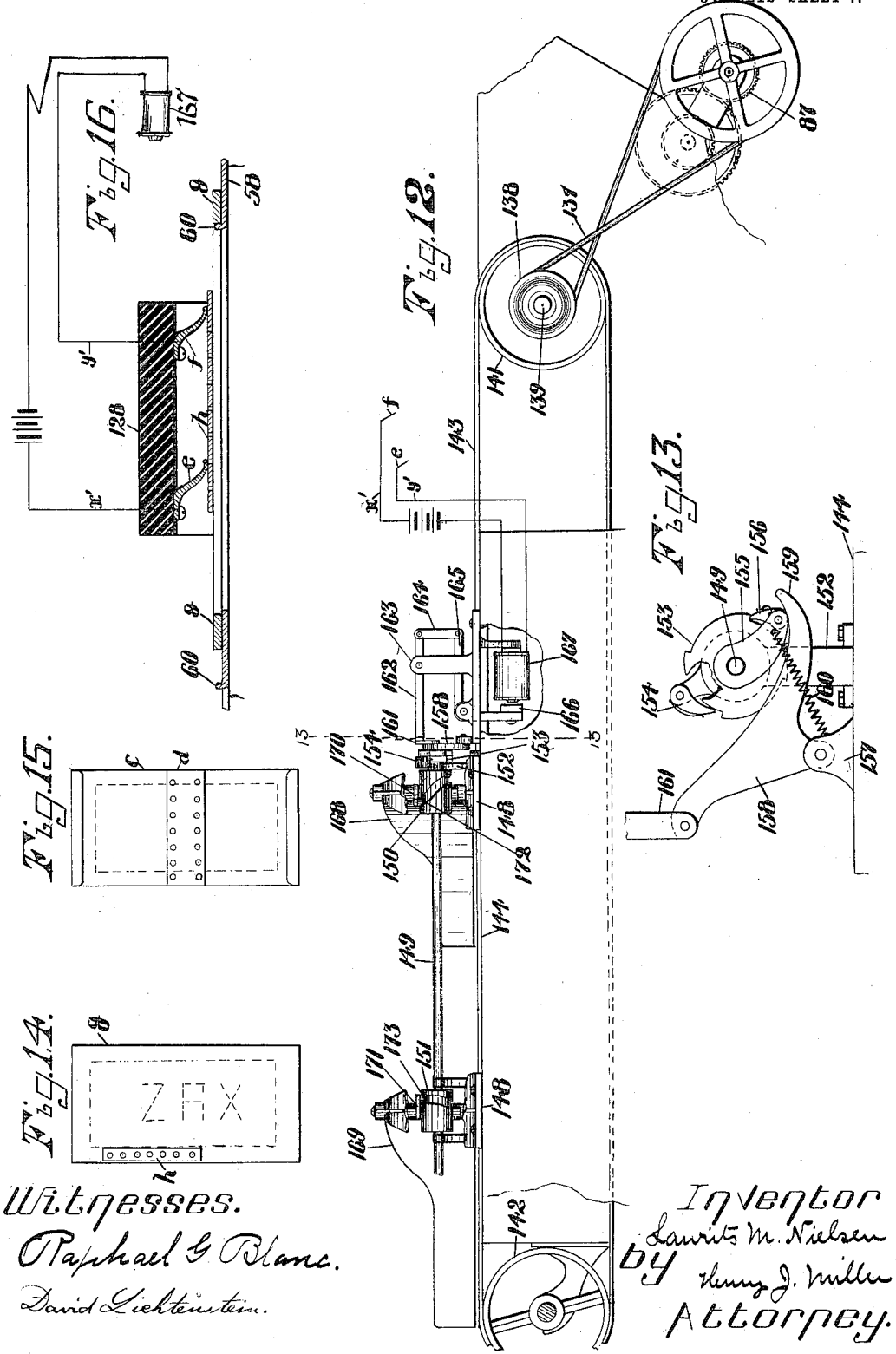

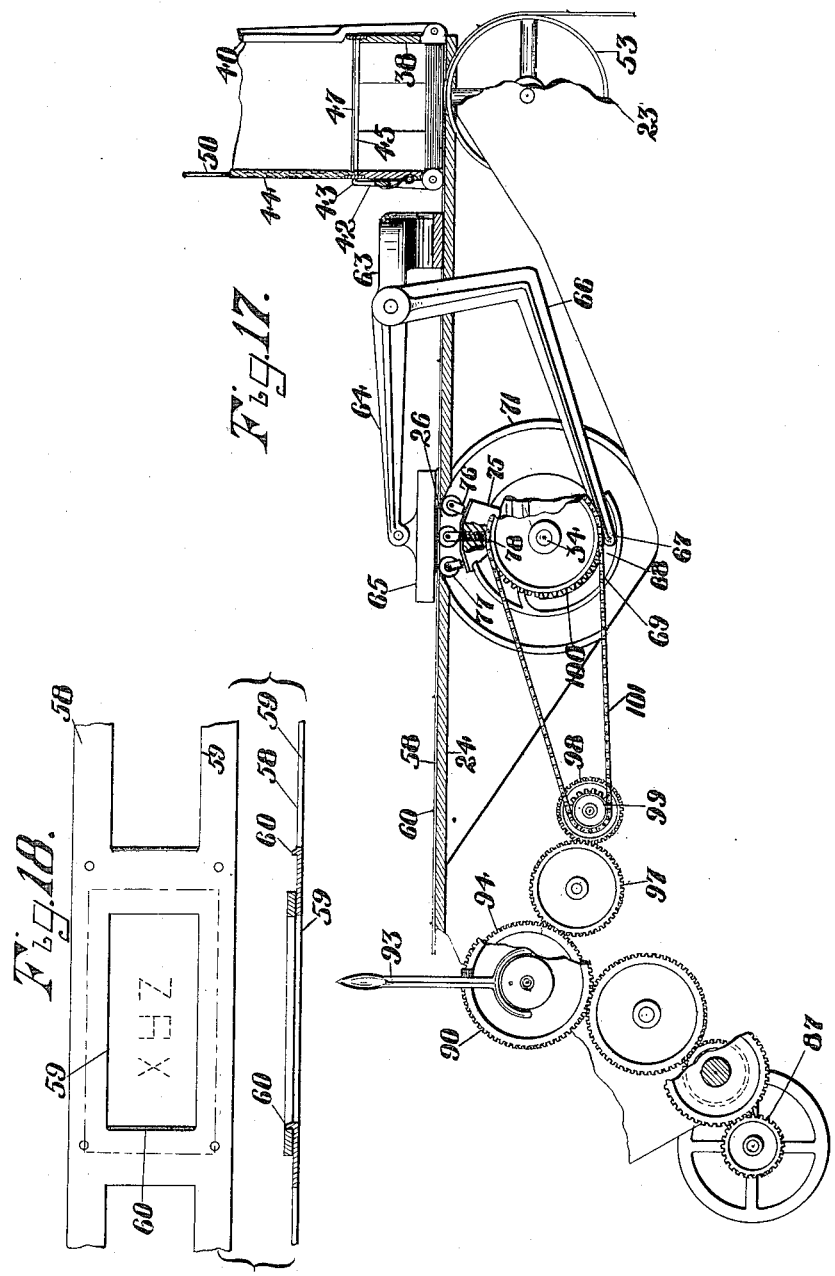

UNITED STATES PATENT OFFICE.

LAURITS M. NIELSEN, OF BOSTON, MASSACHUSETTS, ASSIGNOR, BY MESNE ASSIGNMENTS, TO NIELSEN MAILING MACHINERY COMPANY, OF ERIE, PENNSYLVANIA, A CORPORATION OF MAINE.

MACHINE FOR ADDRESSING AND ASSORTING NEWSPAPERS, &c.

964,449. Specification of Letters Patent. Patented July 12, 1910.

Application filed May 24, 1905. Serial No. 262,064.

*To all whom it may concern:*

Be it known that I, LAURITS M. NIELSEN, of Boston, in the county of Suffolk and State of Massachusetts, have invented certain new and useful Improvements in Machines for Addressing and Assorting Newspapers or the Like; and I hereby declare that the following is a full, clear, and exact description of the same, reference being had to the accompanying drawings, forming part of this specification.

This invention relates to improvements in machines for addressing and assorting newspapers, magazines and similar articles which have, preferably, been previously supplied with wrappers.

In its particular application the invention refers to addressing and assorting machines adapted to be applied to newspaper folding and wrapping machines of the general nature described in Letters Patent of the United States, No. 713,271, dated November 11, 1902, and No. 720,212, dated February 10, 1903, both granted to Lee A. Agnew, assignor to The Agnew Auto Mailing Machine Company.

One object of the invention is to so construct an addressing machine in which a movable address form may be used that a receiver for said forms may be brought to position to receive the forms through the medium of mechanism controlled by the presence of a particular form.

Another object of the invention is to so construct an addressing and assorting machine, in which movable address forms may be used, that the assorting mechanism may be controlled by the presence of a particular form.

Another object of the invention is to improve the construction of the addressing machine.

Another object of the invention is to so construct an addressing and assorting machine of this nature that the printing mechanism may be disconnected at times.

Other objects of the invention will appear from the following description.

The invention consists in the peculiar construction of the addressing machine.

The invention also consists in the peculiar means for delivering address stencils, or printing forms, to the addressing machine in combination with the means, controlled by the presence of a particular stencil, for receiving the stencils from the addressing machine.

The invention also consists in the combination with the stencil moving means, of the assorting mechanism and the peculiar means for controlling the assorting mechanism.

The invention also consists in the peculiar means for delivering articles from the addressing machine feeding device.

The invention also consists in such other novel features of construction and combination of parts as shall hereinafter be more fully described and pointed out in the claims.

Figure 8:
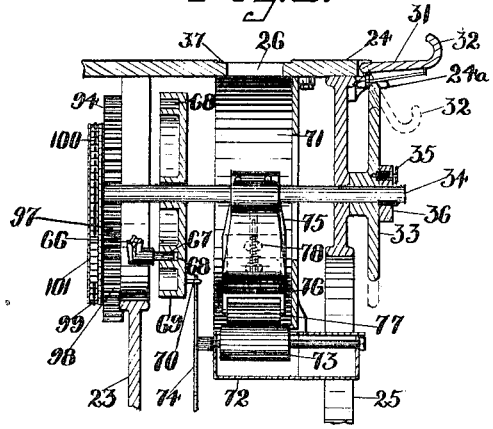

Figure 1, represents a plan view of the improved addressing and assorting machine partially broken away. Fig. 2, represents a front elevation of the addressing machine shown in position on a machine, for folding and wrapping newspapers, magazines, etc., of the nature shown in the patents to L. A. Agnew above referred to; the assorting machine being removed in this figure, to more clearly show the addressing machine. Fig. 3, represents an enlarged front elevation of parts of the addressing machine, the front plate being removed. Fig. 4, represents a cross sectional view of the block carrying the terminals for the electric circuit controlling the address form receiver, a circuit closer being in place. Fig. 5, represents an enlarged detail view of parts of the addressing machine to more clearly illustrate the construction and operation of the receiver for receiving the address forms after they have passed through the addressing machine. Fig. 5ª is a detail view to show the manner of connecting the receiver holding pawls and the means for simultaneously operating said pawls. Fig. 6, represents a cross sectional view of guide and support for the address form receiver, one of said receivers being shown, in end view, thereon. Fig. 7, represents a cross sectional view of the addressing machine taken on line 7—7 Fig. 1. Fig. 8, represents a similar view taken on line 8—8, Fig. 1, to more clearly show the ink supplying device. Fig. 9, represents an enlarged detail view of details of the driving mechanism and the connections with the addressing machine. Fig. 10, represents a similar view taken at right angles to Fig. 9. Fig. 11, represents a vertical sectional view of the clutch connection in said drive gear taken on line 11—11 Fig 10. Fig. 12, represents a front elevation of parts of the assorting or distributing mechanism. Fig. 13, represents a cross sectional view of portions of the same taken on line 13—13 Fig. 12. Fig. 14, represents a plan view of the circuit closer stencil adapted to close the electric circuit through which the assorting or distributing mechanism is controlled. Fig. 15, represents a similar view of the circuit closer by means of which the terminals, shown in detail in Fig. 4, of the electric circuit for controlling the address form receiver holder are closed. Fig. 16, represents a longitudinal sectional view of the insulating block for supporting the terminals of the electric circuit, taken at right angles to Fig. 4, one of the cards illustrated in Fig. 14 being shown in position to close the terminals. Fig. 17, represents a rear elevation, partly in section, of portions of the addressing machine and its drive gear. Fig. 18, represents a plan view and a longitudinal section of the address stencil conveyer band, a stencil being shown in relation thereto.

Similar numbers of reference designate corresponding parts throughout.

As shown in the drawings, in which are illustrated the preferred construction and combination of the several parts, 20 represents a suitable base on which mechanism, of the general nature described in patents to Agnew above cited, is adapted to be supported, this base 20 being provided with the frames 21 and 22, Fig. 2. On these frames 21 and 22 is mounted the back plate 23, shown in Figs. 3, 7 and 8, which extends across the machine and supports the addresser bed plate 24 and the front plate 25 secured to said bed plate. At the central portion of the addresser bed plate is formed the opening 26 through which ink is supplied to the address stencils, or forms, as shall hereinafter be described and, at the rear portion of this bed plate, are located the pinion 27 and the feed rolls 28—28, motion being imparted to the pinion 27, by any suitable means, which motion is transmitted to the rolls 28—28 by the gears 29—29 working in engagement with the gears of said rolls. In brackets carried by the bed plate 24 are mounted the spring pressed rolls 30—30 whereby the articles fed along may be held against the feed rolls 28—28.

At the outer edge of the bed plate 24 is pivotally mounted the article delivery plate 31 having the slots 31ª—31ª and the upturned edge 32 which is designed to be alternately raised to intercept a wrapped magazine, or other article fed forward from the feed rolls 28—28, and depressed to permit the article so intercepted to fall out of said upturned edge, this delivery of the articles being assisted by the fingers 24ª— 24ª of the plate 24 which work through the slots 31ª—31ª; the swinging of this article delivery plate 31 being timed with reference to the arrival of the article and such swinging being effected by means of the cam 33, Figs. 2, 7 and 8, adjustably secured to the shaft 34 by the connecting pin 35 carried by the collar 36 which in turn is keyed to said shaft; this shaft being journaled in bearings in the plates 23 and 25 and driven in a manner to be hereafter described.

The upper surface of the plate 24 has the way 37 at one end of which is located the compartment 38 while at the other end is located the box guide 39, the compartment 38 has an inner shape designed to permit the movement of address stencils, placed flatwise therein, down into said way 37 and on the exterior of this compartment is pivotally mounted the arm 40 having the hook end 41; also pivoted to this compartment is the latch 42 having the pins 43—43.

On the compartment 38 is removably mounted the stencil file drawer 44 shown in detail in Figs. 3 and 6 having the open end 45 furnished with the sliding gate 46, this gate having an opening through which the index and guide card shown in Fig. 15 is exposed to view, and having the sockets 47—47 in which the pins 43 of the latch 42 are designed to engage, while in the end 48 of said drawer is formed the notch 49 with which the hook end 41 of the arm 40 is designed to be engaged to hold the file drawer in the position shown in Figs. 2 and 3; within the file drawer is mounted the longitudinal rod 50 on which the follower 51, having the projection 52, is adapted to slide when its perforated portion is suitably positioned with respect to the rod 50, while, when the file end of this follower is crowded backward sufficiently, the wall of the perforation may frictionally bind against the rod 50, so that when this follower is crowded against the series of stencils in the drawer the follower serves as a clamp, to clamp the stencils between the same and the gate 46, but when the projection 52 rests lightly against the stack of stencils, the file drawer being in position shown in Fig. 3, the follower is supported in the sliding position.

On shafts journaled in bearings of the plates 23 and 25, are the flat face band pulleys 53—54 and 55—56, the mountings for the shaft of the pulley 55 being adjustable in any ordinary manner, and the shaft of the pulley 54 being provided with the member 57 having a series of radial ways or slots into which a pin on a suitable crank, to be hereafter described, may work at times, to effect the intermittent driving of said pulley 54. On these pulleys 53—54 and 55—56 is mounted the metallic stencil-transmitting band 58 which travels in the way 37, through the compartment 38 and the box guide 39, and has a series of openings 59—59 and a series of upwardly extending lips 60—60 as shown in Figs. 1–3 and 18, whereby the stencils are successively and positively fed from the bottom of the pile of stencils in the compartment 38 through the way 37 and positioned above the opening 26, during the dwells in the movement of the band 58, and are thereafter carried by said band to the box guide 39 where the forward end of the stencil frame is engaged by the plate 61 of the box guide while the band 58 follows the curve of the rim of pulley 54. Owing to the intermittent driving of the band 58 the stencils are driven along by series of impulses, the impulse given the stencil as it enters the box guide 39 serving to carry the stencil through said guide and into the receiver 44$^a$, Fig. 5, which receiver is a file drawer 44 the stencil cards previously contained in which have been fed through the machine into a similar drawer.

Mounted on the plate 24 is the bracket 63 on which is pivotally mounted the arm 64 carrying the pivoted impression block 65 which is located above the opening 26 of said plate 24; extending downward from the pivoted portion of the arm 64 is the actuating member 66, which is free to work through a slot in the plate 24, this member having the bearing 67 extending into the path 68 of the cam 69 which cam is mounted on the shaft 34 and has also the pin 70, see Figs. 3, 7 and 8.

Below the opening 26 of the plate 24 is mounted the casing 71 and at the lower part of this casing is the ink reservoir 72 having the ink supply roll 73 the shaft of which is journaled in bearings in the walls of the reservoir and on one end of this shaft is secured the star wheel 74, the arms of which are adapted to be struck by the pin 70 on the cam 69 to effect the intermittent rotation of the ink supply roll.

On that portion of the shaft 34 which extends through the casing 71 is secured the arm 75 on which are mounted the frames 76—76 carrying the inking roll 77, the shanks 78—78 of these frames 76 being movable in guides with which this arm 75 is furnished and being pressed outward by springs embracing these shanks as shown in Figs. 3, 7 and 17, whereby the arms 75 and the rolls 77 are swung around at each rotation of the shaft 34, the rolls 77 taking ink from the roll 73 and being carried across the opening 26 to supply such ink to a stencil located thereabove.

Journaled in brackets on the frame 22 is the main drive shaft 79 provided with the bevel gear 80, the gear 81, the pinion 82; this shaft 79 may be driven in any usual manner but is herein shown as, preferably, provided with the drive pulley 83 having an annular rack with which meshes the pinion 84 of the electric motor 85 of any ordinary construction and suitably supported for such driving purpose. From the gear 81 is driven the shaft 86 journaled in the lower portions of the plates 23 and 25 and having the gear 87, meshing with the pinion 81, and the band pulley 88, the purpose of which will hereafter be described. Motion is imparted by the pinion 82 to the idle gear 89, rotatably mounted on a stud extending from the plate 23, from which idle gear motion is transmitted to the gear 90 on the shaft 91, this shaft being journaled in bearings in the plate 23 and in a bracket 92 secured to the frame 22 and having an upwardly extending arm to which the clutch lever 93 is pivoted; fixed on the shaft 91 is the gear 94 to which the gear 90 is adapted to be connected by the clutch pin 95 entering the sockets 96 of said gear 94.

On a stud extending from the plate 23 is rotatably mounted the idle gear 97 which meshes with the gear 94 and transmits motion from said gear to the pinion 98 journaled on a stud extending from said frame 23 and having attached thereto the sprocket 99 from which motion is transmitted to the sprocket 100, on the shaft 34 by the chain 101, see Figs. 3, 7, 8 and 17.

At the end portion of the shaft 91 is secured the crank arm 102 having the laterally extending pin 103 which, when said shaft 91 is rotated, swings successively into the radial ways in the member 57 of the band pulley 54 and drives said pulley intermittently with a series of impulses whereby the stencil feed strip 58 is driven forward in like manner while, when the pin 103 is disengaged from said radial way the pulley 54 and the band 58 are at rest, this driving of the pulley 54 being so timed with relation to the position of the opening 26 in the plate 24 and the length of the openings 59 in the stencil feed strip 58 that one of said openings 59 is brought opposite the opening 26 in the plate 24 at each of said dwells, whereby a stencil may be carried to such position and brought to a stop while the ink rolls 77 are brought thereunder and the article to be addressed is pressed downward by the impression block 65.

Mounted at the right end, in the position shown in Figs. 2, 3 and 5 of the drawings, of the plate 23 is the inclined receiver support 104, preferably of suitable length to receive two or more of the receivers 44$^a$ and provided at its lower end with the guide block 105 carrying the stop member 106 the downward movement of which is resisted by the spring 107 bearing against a pin on said member 106 and against a portion of the block 105; the member 106 is furnished with teeth 108 against which works the spring actuated pawl 109 which by engaging the teeth 108 prevents undue rebound of the member 106 under the action of the spring 107, immediately after the sudden compression of said spring; a lever 110 pivoted to the block 105 and connected with said pawl 109, is also supplied to effect the drawing back of said pawl against the action of its spring. The receiver support 104 has sides 111 having grooves 112 and, at a convenient position, an opening 113 is formed in the support, the walls of this opening being continued backward to form the compartment 114 having the back 115. In the compartment 114 is pivoted a series of pawls 116—116 having the lever ends 117—117, springs 118—118 connected with these pawls 116—116 and with a fixed part of the machine tending constantly to swing said pawls through the opening 113 beyond the surface of the support 104. The pawls 116—116 being alternately actuated against the strain of their springs by the cams 119—119 of the block 120, rotatable on the stud 121 extending from one of the walls of the compartment 114, said block having the arm 122 furnished with the crank pin 123 on which one end of the connecting rod 124 is pivoted, the other end of said rod being pivotally mounted on a crank pin 125 of the arm 126 fixed on the shaft of the pulley 54. When the block 120 is rotated the cams 119—119 work against the ends 117—117 of their associate pawls 116—116 and effect the alternate retraction of said pawls against the action of their springs, both pawls being thus retracted during each rotation of the pulley 54 and its shaft.

On the back 115 of the receiver support 104 is mounted the magnet 127 which is connected in an electric circuit $x$—$y$ which includes a source of electric energy and the electric contacts $a$—$b$ mounted in the insulating block 128 which is positioned above the way 37 of the plate 24 in such a manner that, when a suitable circuit closer is carried along said way, the electric circuit may be completed between these contacts whereupon the magnets 127 are energized. Pivotally mounted on a stud extending from the wall of the compartment 114 is the armature lever 129 having the armature 130 and the arm 131, the latter being so pivotally connected with both of the pawls 116—116 that, when the armature 130 is attracted by the poles of the magnet 127, both of said pawls may be simultaneously retracted from their engaging position. The closing of the electric circuit between the contacts $a$—$b$ is effected by means of a guide card, stencil or other article adapted to be fed in the path followed by the stencils, in their course through the machine, and having an electric circuit closing plate, as shown in Figs. 4 and 15, in which $c$ represents any suitable article, as one of the stencil frames, and $d$ the circuit closing plate attached to said article. This circuit closing device is generally the first object in the drawer 44 and may be furnished with index numbers or characters which are viewable through the opening in the gate 46 of said drawer, the object being to automatically release the receiver 44$^a$, to which stencils have been delivered, and to bring into position another receiver or drawer to receive the stencil $c$ and the group of stencils associated therewith.

In the guides 112 of the inclined support 104 are freely movable the pins 132—132 of the carriage 133, which is furnished with the pivoted latch plate 134 having projections designed to engage in the sockets 47 of the end 45 of the drawer 44, when used as a receiver, and the pivoted arm 135 adapted to engage in the socket 49 at the upper end of the stencil drawer, or receiver, this carriage 133 is also furnished on its back with the rack 136, see Fig. 5, with which the pawls 116 are designed to alternately engage as said pawls are alternately swung by the cams 119, when the lever 122 is actuated by the connecting rod 124. In practice, several of the carriages 133 with receivers 44$^a$ are mounted on the support 104 and are free to slide down the same when not engaged by the pawls 116, provided they are not supported by one of said carriages which is thus engaged. By reference to Fig. 5 of the drawings it will be noticed that each of the pawls 116 is retracted, from its engagement with the rack 136 of the carriage 133, once during each rotation of the band pulley 54 through the action of the connecting rod 124, and its related parts, whereby at each rotation of the pulley 54 the carriage 133 and the receiver thereon moves downward the distance of two of the teeth of said rack.

Working over the pulley on the shaft of the pinion 87 is the belt 137 by which motion is imparted to the pulley 138 on the shaft 139 which shaft is journaled in a bearing of the plate 25 and in a bearing of the frame 140 which is supported in any suitable manner on the shaft 139, and on a similar pulley 142 journaled in brackets extending from the frames 140 is the feed belt 143 the upper reach of which is designed to travel over the top 144 suitably supported in any usual manner and having one or more deflectors 145 adjacent to which are the rods 146—146 adapted to support mail bags 147 or other suitable receptacles for the addressed mail matter.

On the table 144, at one side of the path in which the belt 143 travels, are secured a suitable number of brackets 148—148 in bearings of which is journaled the shaft 149 having any desired number of cams 150—151 the peripheral cam grooves of which are so located with reference to the periphery of said shaft that the throw and dwell of these cams are successively brought to any particular point in the rotation of the shaft, as is shown in Figs. 1 and 12 of the drawings. One end of this shaft 149 is journaled in the bracket 152 on the table 144, and has the ratchet 153 adapted to be engaged by the spring pressed pawl 154 pivotally mounted on this bracket 152. On this end portion of the shaft 149 is mounted to swing the pawl arm 155 carrying the pivoted spring pressed pawl 156; adjacent this end of the shaft 149 is pivotally supported, by the bracket 157, the rocker 158 having the curved arm 159 bearing against the end of the pawl arm 155 which pawl arm is drawn against said rocker arm 159 by the spring 160 secured to the pawl arm 155 and to some fixed part of the machine, as the bracket 157.

Pivotally secured to the rocker 158 is the link 161 which is connected to the lever 162 pivotally mounted in the bracket 163, on the table 144, and furnished with the link 164 pivoted to said lever and to one arm of the bell crank lever 165 which is pivotally mounted and is provided with the armature 166 adapted to be attracted by the magnet 167, mounted adjacent thereto, when the coils of said magnet are energized by electric current. When the armature end of the bell crank lever 165 is moved toward the magnet 167 the lever 162 moves the link 161 to swing the rocker 158 on its pivot to effect the swinging upward of the free end of the arm 155 whereby the pawl 156 acts to cause a partial rotation of the ratchet 153 and the shaft 149, to which said ratchet is attached, the reverse movement of said shaft being prevented by the pawl 154 engaging with the ratchet, as is shown in Fig. 13.

Mounted to swing on vertical pivots of the brackets 148 are the gates 168—169 having lever arms 170—171 furnished with pins 172—173 which are free to work in the grooves of the cams 150—151, as is shown in Figs. 1 and 12, so that these gates 168—169 are caused to swing by the action of the cams 150—151 on said pins under the rotation of the shaft 149, whereby said gates are caused to swing over the belt at certain points in the rotation of the shaft 149, as shown at 168, Fig. 1, and at other times are caused to swing to the position shown at 169 in said figure, depending on the shape or adjustment of the cams 150—151. The purpose of the gates when in the closed position, shown in Fig. 1 at 168, is to direct articles carried forward by the belt 143 from their forward movement and direct said articles toward the associated deflector 145 which guides them to a suitable receptacle, as the bag 147, while, when the gates are in the open position, as shown by the gate 169 in said figure, the articles carried forward by the belt 143 may pass by said open gates until they reach a closed gate or until they pass over the pulley 142 into some receptacle positioned to receive them.

In an addressing machine of this nature it is important that the rapidly addressed articles should be automatically assorted and, to this end, I prefer to control the opening and closing of the gates 168—169 by means of an electric circuit connected with the magnet 167 and by suitable circuit closers which pass through the machine. To this end I connect the coils of the magnet 167 in an electric circuit $X'$—$Y'$ of which $e$—$f$ mounted in the insulating block 128 are terminals, these terminals being arranged in line so that a stencil $g$ such as is illustrated in Figs. 14 and 16 and carrying the circuit closer $h$ may effect the closing of said circuit by bringing its circuit closer $h$ in contact with the terminals $e$ and $f$ as the stencil is carried forward by the band 58. The stencils as $g$ are usually the first of a series of stencils having addresses of particular cities, towns or districts whereby, when one of these stencils $g$ passes beneath the block 128 its circuit closer $h$ completes the circuit between the terminals $e$ and $f$, the magnet 167 is energized by the electric current and, by the action of the armature 166 and its related mechanism, the shaft 149 is partially rotated to effect the swinging of one or more of the gates 168—169 to open a path for the particular group of articles following the stencil $g$ to a different receptacle than that to which the articles preceding said stencil had been fed. In order to avoid the catching of the articles fed across the table or plate 24 I prefer to supply said table with the plates $24^b$—$24^b$.

The operation of the machine is as follows: A file drawer 44 is placed, with its open end down, on the compartment 38 and is secured in place by means of the pivoted rod 40 and the latch 42, the gate 46 is then withdrawn from its grooves and the stencils contained in the drawer drop downward sufficiently to fill the compartment 38, the downward movement of the stencils being assisted by the pressure of the follower 51 in the file drawer. An empty file drawer $44^a$ mounted on one of the rack carriages 133 is placed in position on the support 104 its lower end being slightly below the end of the box guide 39, the rack 136 of said carriage being engaged by one of the pawls 116, a second empty file drawer $44^a$ with its rack carriage being preferably placed above the first mentioned file drawer. Power is now applied to the mechanism by means of the motor 85 or other suitable driving means and the clutch lever 93 being thrown to the position shown in Fig. 11 the addressing mechanism will be set in operation. The wrapped newspapers, magazines, etc., being fed to the rolls 28—30 in any usual manner, and the rolls 28 being driven by means of the sprocket 174 on the shaft 175 and the chain 176, Fig. 7, working on said sprocket, the shaft 175 having the bevel gear 177, Fig. 9, which meshes with the gear 80 on the shaft 79. The wrapped newspaper is carried by the rolls 28—30 to a point above the opening 26 in the plate 24 and while in such position receives the address in the following manner. When the shaft 91 is rotated, by means of its gear connections with the shaft 79 the pin 103 on the arm 102 of this shaft 91 enters one of the radial ways of the member 57 and effects the partial rotation of said member and of the pulley 54, to which said member is attached, while working in said way thus driving the stencil feed band 58 mounted on the pulleys 53—54 and 55—56. As this feed band is thus carried forward through the compartment 38, one of the projections 60 engages the forward inner edge of the lowermost stencil frame in said compartment, as is shown in Figs. 16 and 18 and carries forward the stencil through an opening in the lower part of said compartment as is shown in Fig. 17, the perforated stencil being disposed above one of the openings 59 in said feed band. The feeding forward of the stencil is timed with relation to the feeding of the wrapped newspaper, etc., so that a stencil is brought to a dwell above the opening 26 approximately at the same time that one of the wrapped newspapers is positioned above said opening and between the stencil and the impression block 65. At the same time the inking rolls 76—76 supply ink to the stencil and the impression block 65 is swung down, by the action of the cam 69, to press the wrapped newspaper downward against the stencil whereby the ink supplied thereto at the same time by the rolls 76 passes through the perforations of the stencil and is received by the wrapper of the newspaper, etc. The impression block 65 is now moved upward by its operating mechanism, and the wrapped, addressed newspaper is pushed forward from its position over the opening 26 by the next succeeding wrapped newspaper, this process being repeated until the foremost wrapped and addressed newspaper is received by the tilt plate 31 and bears against the upturned lip 32, the operation of which will hereafter be described. After the use of the particular address stencil in the addressing operation it is carried forward by the feed band 58 until it enters the box guide 39 and, in its last forward movement, is engaged by the plate 61 and is directed into the receiving file drawer 44ª while the band 58 follows the periphery of the pulley 54. When the wrapped and addressed newspaper, etc., reaches the tilt plate 31 said plate occupies the position shown in Fig. 8 but, immediately thereafter, said plate is permitted to drop, by the rotation of its cam 33, to the position shown in Fig. 7, and the fingers 24ª, working through the slots 31ª in said plate, push the upper portion of the wrapped and addressed newspaper, etc., outward so that it will fall over the curved lip 32 onto the feed belt 143 of the assorting mechanism to be carried forward to one of the receptacles represented by the bag 147.

Each of the file drawers 44 may contain several groups of stencils which groups of stencils are designed to address the wrapped newspapers for different towns or districts, in such case the first stencil in each group is furnished with the circuit closer $h$, Fig. 14, so that in passing beneath the block 128 this stencil effects the closing of the electric circuit $X'—Y'$ by the contact of its closer $h$ with the terminals $e$ and $f$, whereupon the magnet 167 is energized and the armature 166 is attracted thereto, thus actuating the lever 162 to effect a partial rotation of the shaft 149 and the opening or closing of one or more of the gates 168—169 to direct the particular group of addressed newspapers to a receptacle different to that into which the preceding group of newspapers has been directed. After the stencils have moved downward from the file drawer 44 into the compartment 38 the empty drawer is removed from the compartment and another similar drawer is substituted therefor, the gate 46 of this drawer being removed to permit the downward movement of the stencils contained therein, these stencils being preferably preceded in such movement by a stencil or guide card having the circuit closer $d$, shown in Fig. 15. The gate 46 of the empty file drawer is now replaced and this drawer is now preferably supplied with a carriage 133 and is placed at the upper portion of the support 104 to serve as a receiver. At each rotation of the pulley 54 the pawls 116 are operated to release and again engage the teeth of the ratchet 136 of the particular carriage in place and to permit the same and the file drawer carried thereby to move downward sufficiently to receive the stencils fed thereto. When the guide card $c$ is engaged and carried forward by the band 58 it usually follows after a stencil which should preferably be received by the receiving file drawer then in position, the spacing of the projections 60 of said band and the forward movement thereof are therefore preferably arranged and timed to permit the delivery of said preceding stencil to the receiving file drawer before the guide card $c$ reaches the block 128. As stated above the guide card $c$ is preferably an index card having index characters which are viewable through the opening in the gate 46 of its file drawer, whereby these drawers may be conveniently filed in a suitable cabinet. It is therefore important that this index or guide card should be replaced, after passing through the machine, at the open end of one of said file drawers and that the group of stencils to which it forms an index should follow in the sequence occupied by them in the file drawer from which they are fed. As the last of one group of stencils passes into the receiver 44ª, in position to receive the same, the guide card c of the next group of stencils is carried by the band 58 beneath the block 128 and its circuit closer d, during such passage, contacts with the terminals a and b of the electric circuit X—Y, thus closing this circuit and energizing the magnet 127, the armature 130 being attracted by said magnet draws the pawls 116 out of engagement with the rack 136 of the carriage 133 and said carriage with its receiving file drawer slides downward until intercepted by the spring buffer 106, the receiver 44ª and its carriage being then removed from the support 104 is detached from the carriage 133 and is placed in a suitable file cabinet. The closing of the circuit X—Y by the circuit closer is of comparatively slight duration so that when the succeeding receiver file drawer 44ª moves into position the circuit is again opened and the magnet 127 offers no resistance to the backward movement of the armature 130 and pawls 116 under the retracting strain of the springs 118 whereby the pawls 116 are positioned to engage in the rack teeth 136 of the succeeding receiver carriage and to limit its downward movement. The guide card c now enters the receiver file drawer 44ª thus positioned and rests against the gate 46 while the associated group of stencils follow the guide card and are received in the same sequence in which they were fed from the delivery file drawer.

While I have herein specifically described the mechanism whereby the objects of this invention are carried into effect it is not my purpose to limit this invention to the specific construction of the several parts or to their specific combination.

Having thus described my invention, I claim as new and desire to secure by Letters Patent.

1. In an addressing machine, the combination with a compartment having a pivoted arm, and a printing form feeding device working through said compartment, of a storage box for printing forms, removably mounted on said compartment, and having an open side adapted to be closed against the passage of the printing forms by said arm.

2. In an addressing machine, the combination with a compartment having a pivoted arm furnished with a hook end, of a storage box for printing forms mounted on said compartment and having an end with which said hook end of said arm may engage to removably secure said box in place.

3. In an addressing machine, the combination with means for feeding forward stencil printing forms, ink supplying means beneath the path in which said stencils are fed forward, and a pressure applying device, above the point at which the ink supplying devices work, of means for feeding forward articles to be addressed beneath said pressure device and means for subsequently turning over the addressed articles to bring the address uppermost.

4. In an addressing machine, the combination with means for feeding forward articles to be addressed, of a pivotally mounted delivery device for said articles, means for swinging said device, and means adapted to act on said articles at a point in the movement of such delivery device to push the articles therefrom.

5. In an addressing machine, the combination with means for feeding forward articles to be addressed, of a plate pivotally mounted in the path of said articles and having a stop, means for swinging said plate, and means adapted to act on the upper portion of said articles when the plate is swung to tilt said articles over said stop.

6. In an addressing machine, the combination with means for feeding forward articles to be addressed, of a plate pivotally mounted in the path of said articles and having a stop and a slot, means for swinging said plate, and fixed means adapted to extend through such slot when the plate moves downward to tilt said articles over said stop.

7. In an addressing machine, the combination with a bed plate having an opening, a delivery plate pivotally mounted on said bed plate and having an upturned edge, and means for feeding forward articles to be addressed above said opening and toward said delivery plate, of means for feeding forward printing forms above said opening, a pressure device, a shaft journaled beneath said bed plate and provided with ink delivery means adapted to work through said opening, and a cam mounted on said shaft and adapted at times to support said delivery plate.

8. In an addressing machine, the combination with a bed plate having an opening, a casing having a circular wall mounted beneath said opening, an ink reservoir located beneath said casing and provided with an ink supply roll extending into said casing of a shaft rotatably mounted and extending into said casing, spring pressed ink delivery devices carried by said shaft, and means for driving the shaft.

9. In an addressing machine, the combination with a printing form feed band, and pulleys on which said band is mounted, of a form receiver movably mounted, a detent mechanism for said form receiver, and connections between said detent mechanism and one of said band pulleys.

10. In an addressing machine, an inclined supporting way, a carriage movable on said way and adapted to be engaged by a detent mechanism, such detent mechanism, actuating means therefor, printing form feeding means, and connections between said feeding means and actuating means.

11. In an addressing machine, the combination with means for feeding printing forms, of means for receiving said forms comprising an inclined supporting way, a carriage movably mounted on said way and adapted to be engaged by a detent mechanism, detent mechanism, actuating means for such detent mechanism, and a form receiver mounted on said carriage.

12. In an addressing machine, the combination with printing form feeding means, of a storage box for said forms detachably secured in the machine from which the forms are delivered to the feeding means, and a storage box for said forms movably mounted in the machine to receive said forms from the feeding means, a detent mechanism for the receiving box, and connections between said detent mechanism and the feeding means.

13. In an addressing machine, the combination with an inclined way, a pawl pivotally mounted thereon, and means for actuating said pawl intermittently, of a carriage movable on said way and adapted to be engaged by said pawl, and a printing form receiver mounted on said carriage.

14. In an addressing machine, the combination with an inclined way having guides, and a pawl pivotally mounted on the way, of a carriage movably mounted on the way and having a rack adapted to be engaged by said pawl and means whereby a storage box may be secured thereto, and means for intermittently actuating the pawl to release said rack.

15. In an addressing machine, the combination with an inclined way, a pawl pivotally mounted on the way, means for intermittently actuating the pawl, and means for holding the pawl in the retracted position, of a carriage movable on the way and adapted to be engaged by the pawl.

16. In an addressing machine, the combination with printing form feeding means, a receiver movably mounted into which the forms are adapted to be fed, of step by step actuated means for controlling the movement of the receiver, and means for releasing said controlling means to permit the movement of the receiver beyond the point at which the printing forms are fed thereto.

17. In an addressing machine, the combination with an inclined way, a pair of printing form receivers movably mounted thereon, means for intermittently engaging one of said receivers to control its downward movement, and means for holding said engaging mechanism in the disengaged position while one of said receivers passes beyond the same.

18. In an addressing machine, the combination with an inclined support, a pawl movably mounted thereon, and a spring buffer at the lower part of said support, of a carriage movable on said support and adapted to be engaged by the pawl, means for intermittently actuating the pawl, and means for retracting the pawl and holding the same in the retracted position until the passage of the carriage beyond the pawl.

19. In an addressing machine, the combination with an inclined way, a pawl movably mounted on the way, means for intermittently actuating the pawl, a magnet, an armature lever mounted adjacent thereto and connected with the pawl, an electric circuit connected with said magnet, and a circuit closer, of a carriage movable on said way and adapted to be engaged by the pawl.

20. In an addressing machine, the combination with means for feeding forward printing forms, and a movably mounted receiver for said forms, of a detent mechanism for controlling the movement of said receiver, and an electrically controlled retractor for said detent.

21. In an addressing machine, the combination with a movably mounted receiver for printing forms, a detent mechanism for controlling the movement of the receiver, an electrically controlled retractor for said detent mechanism, and an electric circuit including a source of electric energy and having separated terminals, of a movable circuit closer, and means for moving the same against said terminals.

22. An addressing and assorting machine comprising addressing means, means for feeding articles to be addressed therethrough, a delivery belt below the feeding means adapted to receive articles from the feeding means, a gate pivotally mounted at the side of said belt, a cam rotatably mounted, connections between the gate and the cam, and means for rotating the cam to swing said gate.

23. An addressing and assorting machine comprising addressing means, means for feeding articles to be addressed therethrough, a delivery belt below the feedings means adapted to receive articles from the feeding means, a plurality of gates pivotally mounted at the side of said belt, and means for operating said gates in succession to swing them away from the path of the belt.

24. An addressing and assorting machine comprising addressing means, means for feeding articles to be addressed therethrough, a delivery belt adapted to receive articles from the addressing means, a plurality of gates movably mounted at the side of said belt, a shaft journaled in bearings adjacent said gates, cams on the shaft, connections between the cams and the gates whereby the gates are successively moved in one direction by the rotation of the shaft, and means for giving a rotative movement to said shaft.

25. An addressing and assorting machine comprising addressing means, means for feeding articles to be addressed therethrough, a delivery belt adapted to receive such articles from the addressing machine, a plurality of gates pivotally mounted at the side of said belt, a series of cams rotatably mounted adjacent said gates, connections between the cams and their respective gates, and means for effecting the step by step rotation of said cams.

26. An addressing and assorting machine comprising addressing mechanism, means for feeding articles to be addressed therethrough, a delivery belt adapted to receive such articles from the addressing mechanism, gates pivotally mounted at the side of said belt, rotatable means for swinging said gates, and ratchet mechanism for effecting the rotation of such rotatable means.

27. An addressing and assorting machine comprising addressing mechanism, means for feeding articles to be addressed therethrough, a delivery belt adapted to receive such articles from the addressing mechanism, gates at the side of said belt, a shaft rotatably mounted adjacent said gates, cams on the shafts, connections between the cams and the gates, a ratchet on said shaft, a pivoted pawl adapted to act on said ratchet to partially rotate said shaft, and a magnetically actuated means for moving said pawl.

28. An addressing and assorting machine comprising addressing mechanism including means for feeding forward printing forms, a circuit closer adapted to be fed forward by said feeding means, means for feeding articles to be addressed through the addressing mechanism, a delivery device adapted to receive articles from the addressing mechanism, assorting means for assorting said articles by moving the same from said delivery device, electrical means for actuating said assorting means and including an electric circuit having terminals located in the path of said circuit closer.

29. In an addressing machine, the combination with means for feeding forward printing forms, and a circuit closer adapted to be fed forward thereby, of a delivery belt, gates pivotally mounted at the side of said belt, a rotatable shaft having cams, connections between the cams and the gates, and electrically actuated mechanism for effecting the rotation of said shaft including an electric circuit having terminals located in the path of the circuit closer.

30. In an addressing and assorting machine, the combination with addressing mechanism including means for feeding forward printing forms, and a circuit closer adapted to be fed forward thereby, of an electric circuit having terminals, located in the path of said circuit closer, and a magnet, a ratchet mechanism provided with an armature adapted to be attracted by said magnet when said circuit is closed to actuate the ratchet, an assorting mechanism adapted to be operated by said ratchet mechanism, and means for receiving articles from the addressing machine and carrying them to the assorting mechanism.

31. In an addressing and assorting machine, the combination with a delivery belt, gates pivotally mounted at the side of said belt and having lever extensions, a rotatable shaft having cams engaged by said extensions, a ratchet on said shaft, and a pivoted pawl for engaging said ratchet, of a pivoted arm for actuating said pawl, an armature lever pivotally mounted, connections between said lever and arm, a magnet mounted adjacent said armature, an electric circuit connected with said magnet and having a pair of separated terminals, a circuit closer adapted to bridge said terminals, and printing feeding means adapted to feed said circuit closer to said terminals, as described.

32. An addressing machine comprising printing form feeding means, a receiving storage box for said forms movably mounted in the machine to receive said forms from the feeding means, a detent mechanism for controlling the movement of said receiving box, and connections between said detent mechanism and said feeding means.

33. In an addressing machine, the combination with an inclined way, a detent pawl pivotally mounted thereon, and a carriage movably mounted on said way and having a rack adapted to be engaged by said pawl, of means for intermittently actuating said pawl, to release said rack.

In testimony whereof I affix my signature in presence of two witnesses.

LAURITS M. NIELSEN.

Witnesses:
 HENRY J. MILLER,
 S. GOOSTRAY.